United States Patent
LaFleur

(10) Patent No.: US 7,304,114 B2
(45) Date of Patent: Dec. 4, 2007

(54) PROCESSES FOR PREPARING TOUGHENERS FOR THERMOSET COMPOSITIONS

(75) Inventor: Edward Ewart LaFleur, Holland, PA (US)

(73) Assignee: Rohm and Haas Company, Philadelphia, PA (US)

( * ) Notice: Subject to any disclaimer, the term of this patent is extended or adjusted under 35 U.S.C. 154(b) by 441 days.

(21) Appl. No.: 10/922,539

(22) Filed: Aug. 20, 2004

(65) Prior Publication Data

US 2005/0049361 A1 Mar. 3, 2005

Related U.S. Application Data

(60) Provisional application No. 60/499,480, filed on Sep. 2, 2003.

(51) Int. Cl.
C08F 2/06 (2006.01)
C08F 4/34 (2006.01)
C08F 4/36 (2006.01)

(52) U.S. Cl. .................. 526/227; 525/107; 525/118; 525/123; 525/132; 525/143; 525/162; 525/163; 525/168; 525/170; 525/182; 525/183; 525/185; 525/208; 525/217; 525/222; 526/230; 526/232.3; 526/232.5; 526/320; 526/328; 526/328.5; 526/329.7

(58) Field of Classification Search .................. None
See application file for complete search history.

(56) References Cited

U.S. PATENT DOCUMENTS 4,460,746 A 7/1984 Fock et al.
5,312,956 A * 5/1994 Bertsch .................. 558/409
5,576,386 A 11/1996 Kempter et al.
6,433,098 B1 8/2002 Brown et al.
6,566,549 B1 5/2003 Greenblatt et al.
6,605,681 B1 8/2003 Villalobos et al.
6,812,302 B2 * 11/2004 La Fleur .................. 526/89
2003/0022992 A1 1/2003 LaFleur
2003/0050397 A1 3/2003 LaFleur
2005/0101747 A1 * 5/2005 La Fleur .................. 525/523

FOREIGN PATENT DOCUMENTS

EP 0455099 6/1991
FR 2 385 742 10/1978

OTHER PUBLICATIONS

Mulhaupt, R., "Flexibility or Toughness?—The Design of Thermoset Toughening Agents", Chimia 44 (1990), pp. 43-45.

* cited by examiner

*Primary Examiner*—Robert Sellers
(74) *Attorney, Agent, or Firm*—Robert W. Stevenson

(57) ABSTRACT

Liquid rubbers that are ordinarily immiscible in liquid thermoset resins can be made miscible by the addition of at least one non-functional aromatic end-group to the polymer chains of such liquid rubber compositions. Such addition may be initiated by high-temperature peroxides in non-functional aromatic solvents. The liquid rubbers are found to improve the fracture toughness of cured thermoset resins while maintaining dimensional and heat resistance.

5 Claims, No Drawings

PROCESSES FOR PREPARING TOUGHENERS FOR THERMOSET COMPOSITIONS

CROSS REFERENCE TO RELATED PATENT APPLICATIONS

This is a non-provisional patent application of co-pending U.S. provisional patent application Ser. No. 60/499,480 filed Sep. 2, 2003.

BACKGROUND

The present invention relates to processes for preparing tougheners for thermoset compositions, the toughener compositions formed thereby, toughened thermoset compositions containing the toughener compositions, and composite materials and articles formed from the toughened thermoset compositions.

Advanced composite materials having high heat resistance are of utility in high-performance structural applications in the construction, electronic, automotive, computer, aerospace, and electrical industries. Many of these advanced composite materials are based on the thermal curing ("thermosetting") of liquid resin formulations which, upon crosslinking, form rigid, highly crosslinked polymeric matrices.

It is well known that such rigid, highly crosslinked polymeric matrices are brittle and have poor impact strength. Various toughening agents for these thermosetting materials have been developed, including particulate rubbers. The particulate rubbers can be derived from liquid rubbers ("LRs") that have low viscosities and that tend to be miscible with the uncured liquid resin formulations. The LRs can be mixed with the uncured liquid resin formulations, then typically phase separate upon curing (crosslinking) of the thermoset resins to form rubbery microdomains in the crosslinked polymeric matrix of the thermosetting resin. These rubbery microdomains, typically having a size of about 0.1 to about 5 micrometers, help to toughen the rigid crosslinked polymeric matrix while maintaining heat resistance and dimensional stability of the matrix. Various types of LR tougheners are disclosed, for example, in Mulhaupt, R., "Flexibility or Toughness?—The Design of Thermoset Toughening Agents", Chimia 44 (1990), pp. 43-52.

Most, if not all, known LR tougheners contain functional groups. It is generally believed that these functional groups enhance the interfacial adhesion of the phase-separated rubbery domain to the crosslinked polymeric matrix by allowing covalent chemical bonding between the functional groups of the LRs and the functional groups of the crosslinkable polymer resin. Often the functional groups of the LRs are located at the ends of polymer chains, denoted "terminally functional" or "functionally terminated" LRs. In addition, terminal functional groups tend to increase the molecular weight of the polymer chains in the rubbery microdomains during curing, which also tends to improve impact strength.

An important design parameter for an LR toughener is its molecular weight. While phase separation and toughness typically improve with increasing molecular weight of the LR, compatibility between the LR and the uncured liquid thermoset resins typically improves with decreasing molecular weight. Ideally, the LR is miscible with the uncured liquid thermoset resin because single-phase liquid thermoset resin formulations have lower viscosities and better processing characteristics than multi-phase liquid thermoset resin formulations, which tend to exhibit complex rheological behavior.

Commercially available LR tougheners include functionally terminated copolymers of butadiene and acrylonitrile, and include carboxy-terminated copolymers (known as "CTBN"), amino-terminated copolymers ("ATBN"), vinyl-terminated copolymers ("VTBN"), and epoxy-terminated copolymers ("ETBN"). Of the two common thermosetting resins, epoxy and unsaturated polyester, the epoxy resins have proved to be amenable to toughening by low levels of CTBN or ATBN copolymers. The carboxylic acid and amine functional groups are known to enhance the miscibility of the LR tougheners in uncured epoxy resins. These liquid rubbers are also effective in improving crack resistance and impact strength, while minimally affecting the heat distortion properties of the normally brittle epoxy resins.

Unfortunately, there are several drawbacks associated with terminally functional LRs. One is that the functional groups tend to react and crosslink, thereby increasing the molecular weight of the LR. This can lead to viscosity increases and/or reduced miscibility of the LR/thermoset resin liquid blend, which makes processing difficult. This problem is particularly severe for polymers that have reactive functional groups at each end of the polymer chain. Another drawback is that strong interactions and/or reaction between terminal functional groups and reactive groups on the thermosetting resins also causes increased viscosity and reducing miscibility (phase separation) of the LR/liquid thermoset blend.

Another drawback is that while CTBN and ATBN LRs are widely used with epoxy liquid thermoset resins, the incorporation of low levels of CTBN and/or ATBN LRs into unsaturated polyester resins results in negligible improvement in crack resistance and impact strength at the expense of reducing the heat distortion characteristics of the cured resin matrix.

The aforementioned problems thereby preclude the use of such blends, especially those based on unsaturated polyester thermoset resins, in processing operations that require low viscosities, such as pultrusion, resin transfer molding, and spray-up. Moreover, when preparing LR/thermoset liquid resin blends, the end-user must carefully measure and mix these individual components. This hinders the preparation of "one-pack" LR/thermoset liquid resin blends.

The inventors hereof have previously found that liquid rubbers that are ordinarily immiscible in liquid thermoset resins can be made miscible by the addition of at least one non-functional aromatic end-group to the polymer chains of such liquid rubber compositions. These new liquid rubber compositions can be controlled to phase separate into rubbery microdomains upon curing of thermoset resins, including unsaturated polyester thermoset resins. The resulting new composite materials are found to improve the fracture toughness of cured thermoset resins while maintaining dimensional and heat resistance. The new LRs are highly advantageous as the LR/thermoset liquid resin blends remain miscible in the uncured state over time, have low viscosity and easy processability, and are chemically stable.

The new LRs having at least one non-functional aromatic end group are preferably manufactured using hydrocarbon free radical initiators in aromatic solvents, preferably in a continuous flow stirred tank reactor ("CFSTR"). Continuous flow reactors are often preferred for manufacturing processes because they can often improve production capacity.

In continuous reactors the reactants are added and the products are removed simultaneously. In semi-batch reactors the reactants are added continuously while the reaction proceeds, and then the products are removed. In batch reactors reactants are added, the reaction proceeds, and then the products are removed.

While the above process is suitable for its intended purposes, there nonetheless remains a continuing need for improvements in the manufacture of such LRs, in particular methods that allow for manufacture by either contininous, semi-batch, or batch processes. It would be a further advantage if the initiator were commonly available, while still providing control of the molecular weight of the liquid rubbers, thus allowing tailoring of the properties of the LR/thermoset compositions, including stability and processability of the LR/thermoset liquid resins, as well as ductility, crack resistance, and impact strength of LR/thermoset composites. It has been unexpectedly found by the inventors hereof that nonfunctional aromatic-terminated liquid rubbers can be formed using nonaromatic or monoaromatic peroxide initiators by continuous, semi-batch, or batch processes.

STATEMENT OF INVENTION

In a first embodiment of the present invention, there is provided a process for preparing a liquid rubber composition for a cured thermoset resin, wherein the liquid rubber composition is characterized as being miscible in the uncured state of the thermoset resin and immiscible in the cured state of the thermoset resins, the liquid rubber composition comprising polymer chains having at least one non-functional aromatic terminal end-group, a weight average molecular weight of at least 500 g/mol, a glass transition temperature less than 25° C., the process comprising initiating polymerization of a reaction mixture comprising a low Tg monomer and a nonaromatic and/or monoaromatic peroxide initiator; and maintaining the polymerization at temperature and for a time effective to form a reaction product containing the polymer chains, wherein the polymerization is carried out as a single-stage batch polymerization.

In a second embodiment of the present invention, there is provided a process for preparing a liquid rubber composition for a cured thermoset resin, wherein the liquid rubber composition is characterized as being miscible in the uncured state of the thermoset resin and immiscible in the cured state of the thermoset resins, the liquid rubber composition comprising polymer chains having at least one non-functional aromatic terminal end-group, a weight average molecular weight of at least 500 g/mol, a glass transition temperature less than 25° C., the process consisting essentially of: thermally-initiating polymerization of a reaction mixture comprising a nonaromatic-containing peroxide initiator, 1 to 99.999 weight percent of the reaction mixture of at least one $C_1$-$C_{20}$ alkyl acrylate monomer, and 0.001 to 99 weight percent of the reaction mixture of at least one aromatic-containing solvent; and maintaining the polymerization at 200-500° C. for a time effective to form a reaction product containing the polymer chains.

In a third embodiment of the present invention, there is provided a liquid rubber composition formed by the foregoing processes.

In a fourth embodiment of the present invention, there is provided a composite material comprising at least one cured thermoset resin matrix; and rubbery domains dispersed in the matrix, the rubbery domains comprising the liquid rubber formed by the above processes.

In a fifth embodiment of the present invention, there is provided a process for preparing single phase uncured thermoset composition, the process comprising mixing at least one uncured thermoset resin; and a liquid rubber composition formed by the above processes.

It has unexpectedly been found that nonaromatic and/or monoaromatic group containing free radical initiators can be used to prepare the nonfunctional aromatic terminated LRs using free radical polymerization, wherein aromatic solvent-based chain transfer occurs to provide the nonfunctional aromatic end groups. Use of such initiators simplifies the process, and is suitable for use in batch, semi-batch, and continuous processes. The liquid rubbers so produced are comparable to those produced using hydrocarbon-type initiators. In a particularly important feature, the composition, molecular weight, and other characteristics of the LRs produced by the present method can be adjusted so as to improve the solubility of the LRs in the liquid thermoset compositions, thereby yielding LR/liquid thermoset resin compositions of excellent miscibility.

DETAILED DESCRIPTION

The following definitions are used herein. The term "parts" means "parts by weight". Unless otherwise stated, "total parts by weight" do not necessarily add to 100. The term "molecular weight" refers to weight average molecular weight. The term "daltons" and "g/mol" used herein refers to "grams per mole".

The term "alkyl" used herein refers to linear, branched, and cyclic saturated hydrocarbon groups. The term "Cn alkyl", where n is a number, refers to saturated alkyl groups having N carbon atoms. The term "aryl" refers to single and multiple ring aromatic compounds, wherein the aryl groups can be substituted or unsubstituted, for example phenyl biphenyl, naphthyl, biphenyl, anthracenyl, and the like groups. The term "(meth)acrylate" used herein refers to both "acrylate" and "methacrylate".

All ranges disclosed herein are inclusive and combinable. "A" and "an" as used herein are inclusive of one or more of the named article.

The liquid rubbers formed by the present process are composed of flexible polymer chains that have at least one non-functional aromatic terminal end-group. While polymer chain flexibility is provided for by ensuring that the glass transition temperature (Tg) of the polymer chains is less than 25 degrees Celsius ("° C."), it is often typical that the Tg will be less than 10° C., more typically less than 0° C., even more typically less than −20° C., and further typically less than −40° C.

It has unexpectedly been found that nonaromatic-containing peroxide free radical initiators can be used to prepare the nonfunctional aromatic terminated LRs using free radical polymerization, wherein aromatic solvent-based chain transfer occurs to provide the nonfunctional aromatic end groups. Suitable nonaromatic-containing peroxide initiators include high temperature peroxide initiators such as: di-tert butyl peroxide, 2,5-dimethyl-2,5-di(tert-butylperoxy)hexane, 2,5,-dimethyl-2,5-di(tert-butylperoxy)hexyne-3; 3,6,9-triethyl-3,6,9-trimethyl-1,4,7-triperoxonane, 1,1,3,3-tetramethylbutyl hydroperoxide, diisopropylbenzene monohydroperoxide, tert-butyl hydroperoxide, tert-amyl hydroperoxide, and the like, as well as mixtures comprising at least one of the foregoing peroxides. It has further been found that monoaromatic-containing peroxide initiators may also be used, for example cumyl peroxide, tert-butyl cumyl peroxide, diisopropylbenzene monohydroperoxide, di(tertbutylperoxyisopropyl)benzene, and the like, as well as mixtures comprising at least one of the foregoing peroxides. Mixtures of nonaromatic and monoaromatic peroxides may also be used. Other initiators may be present, for example certain alkyl-substituted diphenyl compounds such as 2,3-dimethyl-2,3-diphenylbutane as disclosed in US2003/002292A1, which is incorporated by reference herein in its entirety.

Suitable aromatic solvents are liquid at reaction temperatures, and in include, for example, benzene and naphthylene, as well as C1-C20 alkyl-substituted benzenes such as isopropyl benzene, ethyl benzene, toluene, and C1-C20 alkyl-substituted naphthylenes such as isopropyl naphthylene. Benzenes and naphthylenes containing multiple C1-C20 alkyl subsitutions, such as xylenes, may also be used. Aromatic-containing mineral oils, such as Aromatic 100, may also be provided in the solvent blend.

One or more non-aromatic co-solvents may also be blended with the aromatic solvent as long as chain transfer to the aromatic solvent occurs more often than chain transfer to the non-aromatic co-solvent. Mixtures of two or more aromatic-containing solvents can also be blended, optionally with non-aromatic co-solvents. In solvent blends, the weight percentage of the aromatic solvent to total solvent should be greater than 20, more typically greater than 40, even more typical greater than 60, and most typically greater than 80 weight percent. In cases where the chain transfer coefficient of one or more aromatic solvents is much greater than that of non-aromatic solvents, then the weight percentage of the aromatic solvent can be less than 20 weight percent.

Polymer molecular weight also decreases as the overall frequency of chain transfer increases in free radical chain polymerizations. Accordingly, free-radical chain polymerization of flexible polymers in aromatic-containing solvents at conditions of high pressure and temperature is conducive for preparing flexible polymers having molecular weights up to 20,000 g/mol. Moreover, the resulting flexible polymers contain at least one non-functional aromatic terminal end-group.

Although one non-functional aromatic terminal end-group is sufficient for improving the miscibility of flexible polymer chains in uncured thermoset resins, it is typical that the polymer chains contain more than one non-functional aromatic terminal end-group. Two such aromatic end-groups can be provided by using an aromatic-containing free radical initiator during the polymerization of the LR's polymer chains in aromatic solvent. Thus, some or all of the polymer chains can be both initiated and terminated with an aromatic-containing molecule.

The polymer chains of the liquid rubbers of the present invention have at least one non-functional aromatic end-group. Where the polymeric chains are linear chains having two ends, it is more typical that both ends comprise non-functional aromatic end-groups. Other polymeric architectures (such as graft copolymers, block copolymers, comb polymers, star polymers, starburst polymers, etc.) each having two or more polymer chains or chain fragments are also within the scope of the present invention. Some or all of the chain ends can contain non-functional aromatic end-groups.

The liquid rubber compositions of the present inventions may further comprise other polymer chains that do not have at least one non-aromatic end-group. In these embodiments, the overall average number of non-functional aromatic end-groups per polymer chain in the liquid rubber composition may be less than 1. In these instances, improved liquid rubber miscibility in thermoset resins in the uncured state will occur when the overall average number of non-functional aromatic end-groups per polymer chain in the liquid rubber composition is at least 0.2, typically at least 0.4, more typically at least 0.5, and even more typically at least 0.7.

The weight percentage of the non-functional aromatic end-groups is typically 1-20 weight percent based on the total liquid rubber composition weight. If this weight percentage is less than 1 percent then the liquid rubber composition will tend not to be miscible in the uncured thermoset resin. If this weight percentage is greater than 20 weight percent then the polymer chains will not properly phase separate into rubbery microdomains upon curing of the thermoset resin.

In certain embodiments, it may be desirable to provide additional non-functional aromatic end-groups by post-reaction of the flexible polymer chains with an aromatic-containing molecule. In free radical chain polymerization of ethylenically unsaturated monomer often the terminating chain end will be unsaturated. Subsequent reaction of an aromatic-containing molecule that reacts with the unsaturated chain end will result in the polymer chain having a non-functional aromatic end-group.

The LRs are derived from polymerization of "low-Tg" monomers, that is, monomers that impart the desired Tg (less than 25° C.) to the polymer chains. Suitable polymerizable low-Tg monomers include, for example, C1-C20 alkyl acrylate monomers such as butyl acrylate, ethyl acrylate, n-octyl acrylate, and 2-ethylhexyl acrylate; diene monomers such as butadiene and isoprene; siloxane monomers such as dimethylsiloxane; and vinyl acetate monomers. Mixtures comprising at least one of the foregoing monomers may also be used. C1-C8 alkyl acrylates are particularly preferred for providing liquid rubbers that are stable against light and heat degradation.

For the purposes of maximizing polymer chain flexibility the weight fraction of low-Tg monomer units of the polymer chains should be as high as possible. Accordingly, units derived from the low-Tg monomers typically comprise at least 20, more typically at least 40, even more typically at least 60, and most typically at least 80 weight percent of the polymerized units of the liquid rubber polymer chains. The balance weight fraction of the flexible polymer chains can compose various co-monomers, initiator fragments, chain transfer agents, solvent fragments, functional terminal groups, non-functional terminal groups, coupling agents, crosslinkers, and other polymeric chain fragments such as polymer chains having a glass transition temperature of at least 25° C.

However, under certain circumstances if the weight fraction of the low Tg monomers is high, miscibility problems can occur with the thermoset liquid resin. Accordingly, in instances where miscibility in unsaturated polyester resins is sought, for example, it is desirable that the weight fraction of the units derived from C1-C20 alkyl acrylate monomers typically provide no more than 75, more typically no more than 65, even more typically no more than 55, and most typically no more than 40 weight percent of the polymerized units of the liquid rubber polymer chains, with the balance primarily comprising additional copolymerizable monomer units that improve solubility in the thermoset liquid resin. Methyl methacrylate or methyl acrylate is such an additional monomer that improves solubility.

Various polymerizable co-monomers that may also be incorporated in the polymer chains include one or more ethylenically unsaturated monomers from one or more of the following monomer classes: (meth)acrylic acids; (meth)acrylonitriles; (meth)acrylamides; 2-(perfluoro[C1-C20]alkyl)ethyl (meth)acrylates; 2-(perhalo[C1-C20]alkyl)ethyl (meth)acrylates; alkyl acrylates wherein the alkyl group has greater than 20 carbon atoms; alkyl methacrylates wherein the alkyl groups have 1 to 20, or greater than 20 carbon atoms, and may be substituted; (C1-C20)alkyl(ethyleneoxy)n(meth)acrylates wherein n is 1 to 40; amino (meth)acrylates; aryl (meth)acrylates; conjugated dienes; silanes; siloxanes; vinyl aromatics, including multiple rings and substituted rings; vinyl benzoic acids; aryl groups substituted with ethylenically unsaturated groups such as vinyl; vinyl benzoic acids; vinyl esters; vinyl ethers; vinyl halides; vinyl phosphoric acids; vinyl sulfonic acids; vinylic anhydrides; vinylidene halides; fluorophenyl (meth)acrylates; vinyltrimethylsilanes; and like monomers. Mixtures comprising at least one of the foregoing comonomers may also be used.

The various co-monomers are typically vinyl aromatic (e.g., styrene), (C1-C8) alkyl methacrylic (e.g., methyl methacrylate), and acrylonitrile monomers. These co-monomers help to adjust the solubility of the liquid rubber in the uncured liquid thermoset resins.

The presence of unsaturated (i.e., vinylic) end-groups on the LR polymer chains tends to increase miscibility and/or reactivity with the thermosetting resins. In certain embodiments where the LR polymer chain end contains a vinylic end group, it is desirable to saturate at least a portion, typically at least 50%, and more typically at least 75% of these unsaturated end groups. Accordingly, LRs having fewer vinylic unsaturated end groups will typically phase separate more thoroughly upon cure of the thermoset resin/LR blend composition than the corresponding blend in which the LR has more unsaturated end groups.

The polymer chains may further comprise polymerized units capable of crosslinking as the thermoset resin cures. When used, the amount of such polymerizable crosslinking agents are typically present in an amount of 0.1 to 15 weight percent, more typically 0.5 to 10 weight percent, and more typically 1 to 7.5 weight percent, based on total weight of the polymer chains. Crosslinkable units can provide at least two advantages, in that they typically increase the degree of phase separation of the LR during cure (which typically increases rigidity of the cured thermoset material); and they typically increase the molecular weight of the polymer chains of the rubbery microdomains (which typically increases impact strength of the cured thermoset material).

Monomers providing suitable polymerizable crosslinking units ("crosslinkable monomers") are selected for their copolymerizability with the low Tg monomer(s) and optional comonomer(s), as well as for their ability to further crosslink the LR when the LR/thermoset resin blend is cured, and may be, for example, ethylenically unsaturated compounds with an additional "reactive" component, such as hydroxyethyl (meth)acrylate, 2-hydroxypropyl (meth)acrylate; glycidyl (meth)acrylate; and mixtures comprising at least one of the foregoing crosslinkable monomers.

Another suitable class of crosslinkable monomer includes ethylenically unsaturated monomers that undergo hydrolysis followed by condensation, for example alkoxysilane monomers such as 2-methacryloxyethyl-trimethoxysilane, 3-methacryloxypropyl-trimethoxysilane ("MATS"), 3-acryloxypropyl-trimethoxysilane, and combinations comprising at least one of the foregoing curable monomers. Useful weight ratios of the sum of low Tg monomer(s) and optional comonomer(s) to the polymerizable crosslinking monomer(s) in the LR polymer chains are about 80/20 to 99.9/0.1. When the polymerizable crosslinking monomer is a silane, typical use ratios are about 90/10 to about 98/2, and most typically 94/6 to 98/2.

The polymer chains of the liquid rubbers of the present invention have molecular weights that provide viscosities that are comparable to, and typically less than, the viscosities of the liquid thermoset resins with which they are blended. The molecular weight of polymer chains of the LRs are also selected to be relatively low, which renders them miscible in liquid thermoset resins. The polymer chain molecular weight is typically less than 20,000 g/mol, more typically less than 10,000 g/mol, even more typically less than 5,000 g/mol, and most typically less than 3,000 g/mol. Liquid rubbers having a molecular weight lower than 500 g/mol will tend not to phase separate on cure. Liquid rubbers that do not properly phase separate tend to substantially decrease the thermal dimensional stability by lowering the glass transition temperature of the matrix resin of the cured thermoset article. Accordingly, the polymer chain molecular weight will at least be 500 g/mol, more typically at least 750 g/mol, and even more typically at least 1,000 g/mol.

As mentioned above, the inventors hereof have found that batch or semi-batch polymerization can be used. The batch process of forming the LR includes initiating polymerization of a reaction mixture comprising a free radical polymerizable low Tg monomer, optional co-monomer, optional crosslinkable monomer; an aromatic solvent and an optional nonaromatic solvent; and the nonaromatic-containing initiator; and maintaining the polymerization at a temperature and for a time effective to produce the desired LR.

An exemplary batch process consists essentially of: adding reactants to a reactor to form a reaction mixture comprising a free radical polymerizable low Tg monomer, preferably a C1-C20 alkyl acrylate, and a nonaromatic and/or monoaromatic-containing initiator; initiating polymerization; maintaining the polymerization at temperature and for a time effective to form a reaction product containing the polymer chains; optionally cooling the reaction product; and removing the reaction product from the reactor. The reactants may be added singly or in the form of a reaction mixture. While small amounts of one or more given reactant may be added batch-wise during the course of a reaction in order to adjust the final properties of the product, for example, or small amounts of product may be removed from the reaction to analyze the course of the reaction, it is contemplated that the batch reaction process used herein excludes continuous addition of all reactants and/or continuous removal of all products during the course of polymerization.

Although the process is carried out under a positive pressure, the reaction pressure appears to have no significant effect on the yield.

The reaction residence time in batch reactors is typically controlled by the time allowed for the reaction to occur. For most processes, reaction residence times will typically be less than 1000 minutes. It has been found that at a given temperature, the molecular weight of the LR polymer product generally increases as the residence time increases. It has also been found that degraded side-reaction products increase as the residence time increases. While the residence time in the reaction zone may be as long as 1000 minutes at lower reaction temperatures, normally discoloring reaction by-products and other side reactions will dictate that shorter residence times be employed.

The residence time for most free-radical chain polymerizations is suitably 1 to 100 minutes, and typically, 5 to 50 minutes. In general, longer residence times may increase the yield of product, but the rate of increase of product yield is generally very slow after about 60 minutes of reaction.

Unreacted monomer, initiator, and optional solvent may be readily removed from the reaction product by distillation techniques known in the art.

For increased efficiency, unreacted monomer may be recovered from the reactor by any suitable means known in the art, such as by distillation, and recycled into the reactor in the next batch process.

Suitable reactors for batch reaction are known in the chemical processing art, and can be used for making LRs by the present process. Typically, the reactors provide reaction temperatures up to 500° C. and operating pressures of 1 to 2000 psi, or even 5000 psi. At higher temperatures, the higher gas pressures which result may require special equipment and procedures for safe handling. Because a number of the acrylic monomers are vapors above 200° C. and atmospheric pressure, suitable reactors are typically constructed of materials (e.g., stainless steel) that can withstand high pressures, such as up to 10 MPa. Mixing can be accomplished by many methods known in the chemical processing arts, as described in The Chemical Engineer's Handbook, 5th Edition, Ch. 19, Ch. 21 McGraw-Hill (1973). Suitable polymerization temperatures can be attained, for example by heating coils immersed within the reactor and/or around the outside of the reactor in the form of a heat jacket.

In one embodiment, the reactor is a batch stirred tank reactor ("BSTR") adapted for variable filling operation of from as low as 10 to 100% of the usable volume thereof for the production of LR polymers. The BSTR may be either horizontal or vertical and typically has provision for close control of the temperature therein by any desired means, including control by a cooling jacket, internal cooling coils or by withdrawal of vaporized monomer followed by condensation thereof and return of the condensed monomer to the reaction zone. A plurality of reactors may be operated in series or in parallel.

A BSTR that has been found quite suitable for carrying out the process is a tank reactor provided with cooling coils sufficient to remove any heat of reaction not taken up by raising the temperature of the continuously charged reaction mixture so as to maintain a preselected temperature for polymerization therein. Typically such a BSTR will be provided with at least one and usually more, vaned agitators driven by an external power source, such as a motor. At least one such agitator is positioned to provide agitation of liquid contained in the reactor while operating at minimum filling, i.e., as low as 10% of the volume thereof.

In operating the present process, flexibility and range of choice can be realized in polymer types produced, as well as in the production rate thereof, by proper choice of polymerization reaction conditions.

In certain embodiments, the reaction mixture is charged to the reactor and the temperature of the monomer feed is adjusted, for example to 500° C. to induce polymerization. The reactor can be charged from a stirred feed tank containing the reaction mixture under an inert atmosphere. Inerting, although not required, typically removes oxygen by flushing the reactor with an inert gas, such as nitrogen, argon, or helium. The reaction mixture can be filtered prior to charging. Polymerization conditions are continuously maintained in the reactor to produce a LR polymer of selected molecular weight and selected degree of conversion. Reactors can be operated so as to produce a LR polymer concentration from as low as about 1 percent to as high as 100 percent by weight. The level of filling of the reactor can vary from as low as 10 percent to as high as 100 percent of usable volume and may be controlled by any desired means, for example, a level controller and associated valve or pump in the transfer line from the reactor. After polymerizing the charged reaction mixture to approximately the desired solids content, the reactor is cooled and the liquid mixture of reaction product is typically withdrawn.

Manufacture may also be by a continuous process. In continuous reactors, the desired flow rate selected will depend upon the reaction temperature, constituents, desired molecular weight of product, desired molecular weight distribution, and the particular equipment employed. To produce a given LR polymer of a desired molecular weight with low residual monomer, the reaction temperature and residence times are mutually manipulated in accordance with the principles provided herein.

In processes using CFSTRs, the reactor is typically well mixed to maintain a narrow distribution of residence times of flow elements to generate a homogeneous reaction product. Having a well mixed CFSTR helps to ensure homogeneity in the LR polymer product. CFSTRs that are not well mixed may develop "dead-zones" or areas within the CFSTR from which the reaction mixture is unable to flow and exit the CFSTR. Reaction mixtures in such "dead-zones" may have exceedingly long residence times within the CFSTR, which results in undesirably high molecular weight and degraded reaction products.

The presence of "dead-zones" arising from a poorly mixed CFSTR also results in poor heat transfer leading to "hot-spots" which may also lead to undesirably high molecular weight and degraded reaction products. Sufficient mixing is generally accomplished by using a series of evenly spaced impeller blades on a mixing shaft that rotates rapidly inside the CFSTR. It is also desirable to include baffles inside the walls of the CFSTR to aid mixing.

For increased efficiency, unreacted monomer may be recovered from the reactor by any suitable means known in the art, such as by distillation, and recycled into the reactor.

In one embodiment, the process uses a variable filling type stirred CFSTR for the polymerization of monomers to LR polymers having a narrow-molecular weight distribution by the proper balancing of the conditions of polymerization and flow rates. The reactor may include a CFSTR of any type adapted for variable filling operation of from as low as 10 to 100% of the usable volume thereof for the production of LR polymers. This CFSTR may be either horizontal or vertical and typically has provision for close control of the temperature therein by any desired means, including control by a cooling jacket, internal cooling coils or by withdrawal of vaporized monomer followed by condensation thereof and return of the condensed monomer to the reaction zone.

It will be apparent to those skilled in the art that the reactor used in this embodiment can, if desired, be constituted by a plurality of CFSTRs operated in series. Likewise, it will be apparent that such reactor may include more than one CFSTRs operated in parallel, if it is desired to employ several relatively small reactors to supply the capacity of the final reaction zone rather than a single large reactor for that purpose.

A CFSTR that has been found quite suitable for carrying out the process is a tank reactor provided with cooling coils sufficient to remove any heat of reaction not taken up by raising the temperature of the continuously charged reaction mixture so as to maintain a preselected temperature for polymerization therein. Typically such a CFSTR will be provided with at least one and usually more, vaned agitators driven by an external power source, such as a motor. At least one such agitator is positioned to provide agitation of liquid contained in the reactor while operating at minimum filling, i.e., as low as 10% of the volume thereof.

In operating the present process, flexibility and range of choice can be realized in polymer types produced, as well as in the production rate thereof, by proper choice of polymerization reaction conditions.

In certain embodiments, the reaction mixture is charged to the reactor and the temperature of the monomer feed is raised up to 500° C. to induce polymerization. The reactor is typically charged from an inerted stirred feed tank which contains the reaction mixture. Inerting, although not required, typically removes oxygen by flushing the reactor with an inert gas, such as nitrogen, argon, or helium. After the initial filling of the reactor to the desired preselected level and polymerizing the charged reaction mixture to approximately the desired solids content, the volume of reaction mixture charged thereto is typically adjusted to a value to maintain such preselected level of liquid in the reactor. Thereafter, the liquid mixture of unsaturated reaction product is typically withdrawn from the reactor, to maintain the preselected level of such liquid mixture in the reactor.

Polymerization conditions are continuously maintained in the reactor in certain embodiments to produce a LR polymer of selected molecular weight and selected degree of conversion. Reactors can be operated so as to produce a LR polymer concentration from as low as about 1 percent to as high as 100 percent by weight. The level of filling of the reactor can vary from as low as 10 percent to as high as 100 percent of usable volume and may be controlled by any desired means, for example, a level controller and associated valve or pump in the transfer line from the reactor.

The total amount of polymerizable monomer (low Tg monomer, optional co-monomer, and optional crosslinkable monomer) in the reaction mixture can be 1.0 to 99.999 weight percent, based on total weight of the reaction mixture. Typically, the total amount of polymerizable monomer is at least 10 weight percent, more typically at least 20 weight percent, and even more typically at least 30 weight percent, based on the total weight of the reaction mixture.

The amount of nonaromatic and/or monoaromatic peroxide initiator may be 0.001 to 99 weight percent based on total weight of the reaction mixture. Typically, the amount is at least 0.01 weight percent, more typically at least 0.05 weight percent, even more typically at least 0.15 weight percent, and most typically at least 0.50 weight percent, based on the total weight of the reaction mixture.

The solvent is an aromatic solvent as described above, together with an optional nonaromatic solvent. The amount of aromatic solvent is in the solvent mixture is typically 1-99 weight percent, more typically 5-80 weight percent, more typically 10-75 weight percent, based on the total weight of the solvent mixture. The total amount of solvent is 0.001-90 weight percent, more typically 1-80 weight percent, more typically 1-70 weight percent, and most typically 1-60 weight percent, based on the total reaction mixture.

Effective polymerization temperatures are generally maintained at a temperature of 25 to 400° C., typically less than 300° C. In anionic polymerizations, the polymerization temperatures are typically less than 200° C., more typically less than 150° C., and even more typically less than 100° C. In free-radical chain polymerizations, the polymerization temperatures are typically above 100° C., and more typically above 200° C. In free-radical chain polymerizations the molecular weight of the polymer tends to vary with reaction temperature; below 100° C. typically provides polymers having a molecular weight higher than 20,000 g/mol. As polymerization temperatures exceed about 400° C., side reaction products become more prevalent so that the quality of the product may be compromised.

The present process is adapted to achieve yields, without recycle, of at least about 15% of theoretical. With proper selection of reaction parameters and monomers in accordance with the detailed description of the invention provided, yields between 25% and 90% may be achieved. Generally, percent weight of monomer converted to LR polymer increases with decreasing reaction residence times.

Various processes may be used to produce the single phase, uncured LR/thermoset liquid resin compositions of the present invention. Typically, the LR polymers prepared according to the present invention are suitably mixed with uncured liquid thermoset resins using conventional liquid mixing devices known in the art.

For preparing toughened rigid thermoset resin materials and composites, the weight percentage of the LR in the LR/thermoset resin blend is at least 1.0 weight percent, typically at least 2.0 weight percent, and more typically at least 5.0 weight percent, and typically no more than 25 weight percent, more typically no more than 15 weight percent, and most typically no more than 10 weight percent.

Soft and flexible thermoset resin materials and composites (compared relatively to those described in the preceding paragraph) can also be prepared when the weight percentage of the thermoset resin in the LR/thermoset resin blend is at least 10.0 weight percent, typically at least 20.0 weight percent, and more typically at least 30.0 weight percent, and typically no more than 75 weight percent, more typically no more than 60 weight percent, and most typically no more than 50 weight percent.

Most, if not all, of the commercially available thermoset resins can be used in the present invention, for example, alkyd resins, allyl diglycol carbonate resins, diallyl isophthalate resins, diallyl phthalate resins, melamine resins, melamine/phenolic resins, phenolic resins, vinyl ester resins; epoxy resins, unsaturated polyester resins, cyanoacrylate resins, melamine-formaldehyde resins, polyurethane resins, polyimide resins, polyphenol resins, and combinations comprising at least one of the foregoing resins. While any of these thermoset resins can be used to prepare miscible resin formulations with the LRs of the present invention, the LRs are typically miscible in unsaturated polyester resins, vinyl ester resins, and epoxy resins.

The miscible blends of liquid rubbers produced as described herein and thermoset resins have improved viscosity characteristics for improved processing of rubber-modifier thermoset resins. These miscible blends also provide improved toughening in the resulting thermoset composite materials with minimal reduction in heat and dimensional stability.

Preparation of Liquid Rubbers

Liquid Rubber A

A liquid rubber suitable for preparing single phase uncured LR/thermoset liquid resin compositions in accordance with the present invention was prepared by batch free radical polymerization in a CFSTR as follows. A monomer mixture was prepared from n-butyl acrylate ("BA"), methyl methacrylate ("MMA"), and glycidyl methacrylate ("GMA") in a weight ratio of 90:5:5. Di-tertiary butyl peroxide ("DTBP", 4 weight percent based on the total weight of the monomer) was added and this mixture was fed into a glass vessel. The mixture was purged with an inert gas such as nitrogen, then degassed and stored under a nitrogen blanket. The solvent/chain transfer agent (toluene, 20 weight percent based on the total weight of monomer charged) was charged to the reactor, which was set at an external pressure, via the grove valve, of 125 psi. The reactor (solvent) was then heated to a constant temperature of 200° C. Within a few seconds of the temperature becoming stable, the monomer mixture was introduced into the reactor through a high capacity pump within a six minutes (flow rate=30 grams/minute) and the entire mixture was agitated at 300 rpm. The mixture was then pumped through a series of filters into a 600 mL-BSTR in which the monomers were copolymerized over about 40 to 60 minutes, resulting in a 92-95 weight percent monomer conversion. The residual monomer and solvent was removed by vacuum devolatilization to yield the finished product, p(BA/MMA/GMA) having a weight ratio of 90/5/5. The devolatilization can also be carried out by passage through a static mixer (18 inches long, 1 inch diameter), under low pressure.

NMR spectroscopy indicates the product comprises approximately 0.72 moles of terminal units derived from BA, 30.75 moles of internal units derived from BA, 1.30 moles of internal units derived from GMA, 1.30 moles of terminal units derived from toluene, and 1.65 moles of units derived from methyl methacrylate. NMR spectroscopy also indicated that benzyl groups (derived from toluene) were incorporated into the polymer chain in the form of a dimer with methyl methacrylate. No initiator fragments were detected in the polymer chain.

Liquid Rubber B

A liquid rubber suitable for preparing single phase uncured LR/thermoset liquid resin compositions in accordance with the present invention was prepared by batch free radical polymerization in a BSTR as follows. A monomer mixture was prepared containing BA (200.2 grams), MMA (200.2 grams), GMA (22.23 grams), and DTPB (4% based on the weight of monomer, 16.90 grams). This mixture was fed into a glass vessel in which the mixture was degassed and stored under an inert atmosphere (nitrogen). The solvent/chain transfer agent (toluene, 181.13 grams, 30 weight percent of the total reaction mixture) was charged to the reactor, which was set an external pressure, via the grove valve, of 125 psi. The reactor (solvent) was then heated to a constant temperature of 200° C. Within a few seconds of the temperature becoming stable, the reaction mixture was introduced into the reactor through a high capacity pump within six minutes. The entire mixture is agitated at 300 rpm. Within the first three minutes a temperature increase of 25° C. occurred. This is the only noticeable exotherm. The entire batch became stable within 20 minutes at the preset conditions. The entire cycle, including polymerization and cooling, lasted for 2 hours, achieving a conversion of 89% and a solids content of 71.78%. Residual monomer and solvent were removed by vacuum devolatilization, yielding p(BA/MMA/GMA) having a weight ratio of 47.5/47.5/5.

NMR spectroscopy indicates the product comprises approximately 1.15 moles of terminal units derived from BA, 7.57 moles of internal units derived from BA, 0.65 moles of internal units derived from GMA, 0.53 moles derived from toluene, and 5.68 moles of internal units derived from methyl methacrylate. Terminal units derived from methyl methacrylate were also present. NMR spectroscopy also indicated that benzyl groups (derived from toluene) were incorporated into the polymer chain in the form of a dimer of methyl methacrylate. No initiator fragments were detected in the polymer chain.

Liquid Rubber C

A liquid rubber was made by the procedures set forth in the procedure for Liquid Rubber B, with the exception that xylene was used as the solvent in an amount of 20 percent by weight of the total reaction mixture, to yield p(BA/MMA/GMA) having a weight ratio of 47.5/47.5/5.

Liquid Rubber D (Comparative)

A liquid rubber suitable for preparing single phase uncured LR/thermoset liquid resin compositions was prepared using a continuous flow reaction in accordance with the procedures set forth in U.S. 2003/0022992 A1 as follows. The monomers (BA, MMA, and GMA), initiator (3,4-dimethyl-3,4-diphenylbutane, typically 4 percent by weight of monomer), and solvent (toluene, 20% by weight of the total reaction mixture) were mixed and fed into a glass vessel that was purged with nitrogen. After purging, the mixture was degassed and kept under a nitrogen blanket. The mixture was then pumped at a rate of 12 g/minute through a series of filters into a 600-mL CFSTR in which the monomers were copolymerized to yield the liquid rubber polymer product. The reaction conditions were as follows: Temperature: 260-300; Pressure: 300-800 psi; Reactant Flow Rate: 10-15 g/min.; Residence Time in Reactor: 40-60 minutes. Monomer to polymer conversion was typically 92-95 weight percent. Residual monomer and solvent were removed by vacuum devolatilization to yield p(BA/MMA/GMA) having a weight ratio of 47.5/47.5/5.

Liquid Rubber E

A liquid rubber was made by the procedures set forth in method for Liquid Rubber D, with the exception that the amounts of monomers were adjusted and xylene was used as the solvent in an amount of 20 percent by weight of the total reaction mixture, to yield p(BA/MMA/GMA) having a weight ratio of 80.8/14.2/5.

Liquid Rubber F

A liquid rubber was made by the procedures set forth for Liquid Rubber D, with the exception that xylene was used as the solvent in an amount of 20 percent by weight of the total reaction mixture, to yield p(BA/MMA/GMA) having a weight ratio of 47.5/47.5/5.

The following Table 1 provides a comparison between the molecular weight data for oligomers made by the present batch and comparative continuous process.

| Liquid Rubber | Process | Mw | Mn | Mw/Mn |
| --- | --- | --- | --- | --- |
| D (Comparative) | CFSTR | 2375 | 1333 | 1.78 |
| E | CFSTR | 2318 | 1028 | 2.25 |
| F | CFSTR | 2187 | 999 | 2.19 |
| C | Batch | 2231 | 1074 | 2.08 |

Without being bound by theory, it is proposed that in the batch and CFSTR processes, the initiator (di-tertiary butyl peroxide) functions mainly as an activator of the methyl group of toluene or xylene and methyl methacrylate, which explains the incorporation of the benzyl group and MMA in the form of its dimer on the oligomer chain. The batch procedure apparently favors the generation of large concentration of active radicals, initially from the peroxide molecule and subsequently from the solvent (toluene or xylene) and MMA monomer. During the early stages of the batch reaction process, chain transfer reaction, i.e., termination, is favored over propagation. In the latter stages, the increased monomer concentration increases the rate of propagation at the expense of the rate of termination. This competition eventually leads to a quasi-steady state similar to that which occurs in the CFSTR vessel at steady state.

Preparation of LR/Thermoset Composites

EXAMPLE 1 (COMPARATIVE)

A resin mixture comprising a bisphenol-A epoxy based vinyl ester thermosetting resin, DERAKANE 411-C-50 (Dow Chemical Company), no LR, 1.7% of a non-foaming peroxide catalyst, Trigonox 239A (Akzo Nobel) and 0.4% of a reducing agent, cobalt naphthenate (6% Co and 53% mineral spirits, Alfa Aesar) was prepared as follows. Eight hundred (800) grams of vinyl ester resin was charged to a resin kettle and sparged for 15 minutes with dry nitrogen. At the end of the 15 minutes, the resin was placed under vacuum (635 mm Hg) and degassed for fifteen minutes. The promoter, cobalt naphthenate, was then added to the resin, followed by vigorous mixing to yield a uniform mixture, followed by the initiator, Trigonox 239A. After addition of the initiator, the entire mixture was degassed for 15 minutes to remove any entrained gas bubbles that resulted from the mixing process.

Prior to curing of the liquid resin mixture, a closed aluminum metal mold was evacuated to a pressure of 635 mm Hg. The degassed liquid resin mixture was injected into the mold with the aid of a 50-psi back pressure. The resin was subsequently cured at room temperature for a minimum of 12 hours and post cured at 125° C. for 1 hour in a forced air oven.

After curing, the solid panels were removed from the molds and test pieces were cut for evaluation in accordance with ASTM standard test procedures.

EXAMPLE 2 (COMPARATIVE)

Example 1 was repeated with the exception that a rubber-modified vinyl ester thermosetting resin was used, DERAKANE 8084 (Dow Chemical Company). This material is formulated from the reaction product of bisphenol-A epoxy, carboxyl-terminated butadiene acrylonitrile copolymer, and methacrylic acid.

EXAMPLE 3 (COMPARATIVE)

Example 1 was repeated with the exception that the liquid resin mixture contained 720 grams of DERAKANE 411-C-50 and 80 grams of Liquid Rubber D. The resulting uncured thermoset resin composition was transparent, indicating that a single phase uncured thermoset composition had been prepared.

EXAMPLE 4

Example 1 was repeated with the exception that the liquid resin mixture contained 720 grams of DERAKANE 411-C-50 and 80 grams of Liquid Rubber F. The resulting uncured thermoset resin composition was transparent, indicating that a single phase uncured thermoset composition had been prepared.

EXAMPLE 5

Example 1 was repeated with the exception that the liquid resin mixture contained 720 grams of DERAKANE 411-C-50 and 80 grams of Liquid Rubber C. The resulting uncured thermoset resin composition was transparent, indicating that a single phase uncured thermoset composition had been prepared.

The following ASTM Tests were used to evaluate the properties of cured thermoset test panels:

| Property: | ASTM TEST |
|---|---|
| Kic and Gic | D 5045-96 |
| Tensile Modulus | D 638 |
| Flexural Modulus | D 790 |
| Deflection Temperature Under Load (HDT) | D 648 |

The physical and mechanical properties of a cured thermosetting resin without rubber modifier (Example 1), a cured thermosetting in-situ rubber modified resin (Example 2), a cured thermosetting resin modified using a rubber manufactured by a continuous process using a hydrocarbon initiator (Example 3); a cured thermosetting resin modified using a rubber manufactured by a continuous process of the present invention using a nonaromatic peroxide initiator (Example 4), and a cured thermosetting resin modified using a rubber manufactured by the present batch process using a nonaromatic peroxide initiator (Example 5) are shown in Table 2.

TABLE 2

| | Example No. | | | | |
|---|---|---|---|---|---|
| Component | 1* | 2* | 3* | 4 | 5 |
| DERAKANE 411-C-50, wt % | 100 | — | — | 90 | 90 |
| DERAKANE 8084, wt % | — | 100 | — | — | — |
| Liquid Rubber D$^a$, wt % | — | — | 10 | — | — |
| Liquid Rubber F$^b$, wt % | — | — | — | 10 | — |
| Liquid Rubber C$^c$, wt % | — | — | — | — | 10 |
| Tensile Properties | | | | | |
| Strength, Mpa | 85.5 ± 4.70 | 80.67 | 73.64 ± 0.26 | 75.22 ± 0.52 | 73.98 ± 0.22 |
| Modulus, Gpa | 3.50 ± 0.09 | 2.92 | 3.03 ± 0.04 | 3.25 ± 0.05 | 3.10 ± 0.09 |
| Strain Yield,% | 0.0 | 4.81 | 4.74 | 4.47 | 4.49 |
| Strain Break,% | 3.84 | 5.85 | 9.29 | 6.43 | 6.65 |
| Flexural Properties | | | | | |
| Strength, Mpa | 150.20 | 153.8 | 138.70 | 139.8 | 133.5 |
| Modulus, Gpa | 2.96 | 2.95 | 2.62 | 2.62 | 2.13 |

TABLE 2-continued

| Component | 1* | 2* | 3* | 4 | 5 |
|---|---|---|---|---|---|
| Strain Yield, % | 5.9 | 7.4 | 7.90 | 7.5 | 7.5 |
| Strain Break, % | 20.9 | 30.2 | 8.90 | 7.6 | 7.7 |
| Fracture Toughness | | | | | |
| Kic, MPam$^{1/2}$ | 1.17±0.06 | 1.4 ±0.08 | 1.55±0.05 | 1.60±0.08 | 1.52±0.07 |
| Gic, J/m$^2$ | 211.33±48 | 172.80± 35 | 392.32± 46 | 549 ± 83 | 421.90± 92 |
| Heat Distortion Temperature | | | | | |
| HDT (UA), ° C. | 101.55 | 82.0 | 94.20 | 90.95 | 94.50 |
| HDT (A), ° C. | 102.25 | 84.3 | 97.55 | 93.85 | 93.50 |
| Barcol Hardness | 20.80 | 22.1 | 14.20 | 15.5 | 15.0 |
| Viscosity, cPoise | 160 | 590 | 180 | 210 | 220 |

*Comparative Example
$^a$p(BA/MMA/GMA) = 47.5/47.5/5, continuous process in toluene
$^b$p(BA/MMA/GMA) = 47.5/47.5/5, continuous process in xylene
$^c$p(BA/MMA/GMA) = 47.5/47.5/5, batch process in xylene As may be seen by reference to Table 2, the rubber-modified composite of Example 3 shows significant improvement in the fracture energy over the unmodified composite of Example 1. In addition, the overall balance of properties of Example 3, containing a continuous-flow manufactured rubber, is comparable to that of the composite manufactured from the commercially available rubber-modified resin of Example 2. Example 3 further exhibits a fourteen percent and seven percent decrease in tensile and flexural strength, respectively, compared to the unmodified composite of Example 1.

The reductions in tensile and flexural strengths are common attributes of rubberized thermosetting resin systems. The minor sacrifices of tensile and flexural strengths are significantly compensated for by the improvements in fracture toughness (32% increase in Kic) and fracture energy released rate (86% increase in G$_{IC}$). When these property enhancements are combined with the small change in the heat distortion temperature (8% decrease in HDT) and viscosity, Example 3 appears to be superior in thermal and mechanical properties to the composite manufactured from the commercially available rubber-modified resin of Example 2.

A comparison of Examples 3, 4, and 5 suggests that neither the processes, batch versus CFSTR, nor the solvents, toluene versus xylene, affect the performance of the liquid rubber samples. This suggests that the product quality should not be adversely affected in substituting a nonaromatic peroxide initiator for a hydrocarbon initiator, a batch process for the CFSTR process, and/or employing xylene instead of toluene as the polymerization solvent.

EXAMPLE 6 (COMPARATIVE)

Example 1 was repeated with the exception that the bisphenol-A epoxy vinyl ester used was DERAKANE 441-400 (Dow Chemical Company).

EXAMPLE 7

Example 1 was repeated with the exception that the liquid resin mixture contained 720 grams of DERAKANE 441-400 and 80 grams of Liquid Rubber E. The resulting uncured thermoset resin composition was transparent, indicating that a single phase uncured thermoset composition had been prepared.

EXAMPLE 8 (COMPARATIVE)

Example 1 was repeated with the exception that the liquid resin mixture contained 720 grams of DERAKANE 441-400 and 80 grams of Liquid Rubber D. The resulting uncured thermoset resin composition was transparent, indicating that a single phase uncured thermoset composition had been prepared.

EXAMPLE 9

Example 1 was repeated with the exception that the liquid resin mixture contained 720 grams of DERAKANE 441-400 and 80 grams of Liquid Rubber F. The resulting uncured thermoset resin composition was transparent, indicating that a single phase uncured thermoset composition had been prepared.

EXAMPLE 10

Example 1 was repeated with the exception that the liquid resin mixture contained 720 grams of DERAKANE 441-400 and 80 grams of Liquid Rubber C. The resulting uncured thermoset resin composition was transparent, indicating that a single phase uncured thermoset composition had been prepared.

The physical and mechanical properties of a cured thermosetting resin without rubber modifier (Example 6) are shown in Table 3. DERAKANE 441-400 differs from DERAKANE 411-C-50 in that the former resin contains 28 weight percent of styrene whereas the latter resin contains 50 weight percent of styrene. These two vinyl ester resins also differ in the molecular weight of the vinyl ester macromer. The DERAKANE 411-C-50 resin is prepared from a higher molecular weight macromer than that used in formulating the DERAKANE 441-400 resin.

Table 3 also shows data from a cured thermosetting resin modified using a rubber manufactured by a continuous process using a hydrocarbon initiator (Example 8); two cured thermosetting resins modified using rubbers manufactured by a continuous process of the present invention using a nonaromatic peroxide initiator (Examples 7 and 9), and a cured thermosetting resin modified using a rubber manufactured by the present batch process using a nonaromatic peroxide initiator (Example 10).

TABLE 3

| Component | Example No. | | | | |
|---|---|---|---|---|---|
| | 6* | 7 | 8* | 9 | 10 |
| DERAKANE 441-400 | 100 | 90 | 90 | 90 | 90 |
| LiquidResinEa | — | 10 | — | — | — |
| LiquidResinDb | — | — | 10 | — | — |
| Liquid Resin F C | — | — | — | 10 | — |
| Liquid Resin C d | — | — | — | — | 10 |
| Tensile Properties | | | | | |
| Strength, MPA | 86.88 ± 7.89 | 78.05 ± 0.67 | 92.19 ± 1.14 | 89.70 ± 1.91 | 90.05 ± 1.9 |
| Modulus, Gpa | 3.52 ± 0.13 | 3.30 ± 0.07 | 3.58 ± 0.09 | 3.59 ± 0.11 | 3.69 ± 0.05 |
| Strain Yield, % | 0.0 | 4.36 | 4.64 | 4.52 | 4.68 |
| Strain Break, % | 3.61 | 5.54 | 4.86 | 4.64 | 5.15 |
| Flexural Properties | | | | | |
| Strength, Mpa | 143.70 | 121.7 ± 28 | 160.90 | 161.2 | 134.5 |
| Modulus, Gpa | 3.18 | 2.30 ± 0.09 | 3.32 | 2.92 | 2.89 |
| Strain Yield, % | 5.10 | 5.5 | 6.10 | 6.9 | 5.2 |
| Strain Break, % | 19.7 | 17.00 | 19.8 | 23.4 | 22.4 |
| Fracture Toughness | | | | | |
| Kic, MPam$^{1/2}$ | 0.96±0.21 | 1.52±0.11 | 1.14±0.15 | 0.90±0.07 | 1.10±0.1 |
| Gic, J/m$^2$ | 89.58± 55 | 403.6 ± 96 | 242.46± 74 | 155.72± 30 | 205.28± 53 |
| Heat Distortion Temp. | | | | | |
| T (UA), ° C. | 111.90 | 98.6 | 97.40 | 97.80 | 98.50 |
| T (A), ° C. | 112.40 | 100.2 | 97.80 | 97.65 | 96.60 |
| Barcol Hardness | 27.10 | 15.8 | 25.40 | 26.30 | 28.9 |
| Viscosity, cPoise | 540.00 | 690 | NM | 840 | 820 |

*Comparative Example
a p(BA/MMA/GMA), 80.8/14.2/5, continuous process in xylene
b p(BA/MMA/GMA), 47.5/47.5/5, continuous process in toluene)
c p(BA/MMA/GMA), 47.5/47.5/5, continuous process in xylene
d MJC0353 p(BA/MMA/GMA), 47.5/47.5/5, batch process in xylene The data from Examples 6 and 8 show that the rubber modifier prepared by a continuous process using a hydrocarbon initiator significantly improves the properties of the cured DERAKANE 441-400 resin. The improvement in properties is superior to that of the commercially available, rubber modified DERAKANE 8084 resin (Example 2 of Table 2). The response of the DERAKANE 441-400 resin to the toughener is significantly different when compared to the response of DERAKANE 411-C-50, in that the there are significant increases in tensile and flexural strengths and moduli. A small increase is noticeable in the $K_{IC}$ value whereas the fracture energy released rate, $G_{IC}$, shows a 181% increase in value.

Examples 7 and 9 show that a different balance of properties is attainable with a rubber having a higher concentration of BA. A reduction in tensile and flexural strength is more than compensated by significant increases in fracture toughness and fracture energy released rate. These gains in fracture toughness are not accompanied by significant reduction in heat distortion temperature. This suggests that a reasonable balance of properties is attainable by adjusting the BA concentration of the modifier for modification of the DERAKANE 441-400 resin.

A review of the data for Examples 8-10 shows that substitution of batch for CFSTR process and xylene for toluene does not appear to have deleterious effects on the product quality and ultimate performance of the liquid rubber samples.

The invention claimed is:

1. A process for preparing a liquid rubber composition for a cured thermoset resin, wherein the liquid rubber composition is characterized as being miscible in the uncured state of the thermoset resin and immiscible in the cured state of the thermoset resins, the liquid rubber composition comprising polymer chains having at least one non-functional aromatic terminal end-group and at least one unsaturated end group, a weight average molecular weight of at least 500 g/mol, a glass transition temperature less than 0° C., the process comprising initiating polymerization of a reaction mixture comprising a nonaromatic peroxide initiator, an aromatic solvent, and a free radical-initiated polymerizable low Tg monomer;

conducting the polymerization in a batch process; and maintaining the polymerization at a temperature of 25° to less than 300° C. for a time effective to form a reaction product containing the polymer chains.

2. The process of claim 1, wherein the polymerization is carried out as a semi-batch or batch polymerization.

3. The process of claim 1, wherein the polymerization is carried out as a continuous polymerization.

4. The process of claim 1, wherein the reaction mixture comprises at least 10 weight percent of a C1 to C20 alkyl acrylate monomer.

5. A process for preparing a liquid rubber composition for a cured thermoset resin, wherein the liquid rubber composition is characterized as being miscible in the uncured state of the thermoset resin and immiscible in the cured state of the thermoset resins, the liquid rubber composition comprising polymer chains having at least one non-functional aromatic terminal end-group and at least one unsaturated end group, a weight average molecular weight of at least 500 g/mol, a glass transition temperature less than 0° C., the process consisting essentially of:

thermally initiating polymerization of a reaction mixture comprising
a nonaromatic peroxide initiator,
1 to 99.999 weight percent of the reaction mixture of at least one $C_1$-$C_{20}$ alkyl acrylate monomer, and
0.001 to 99 weight percent of the reaction mixture of at least one aromatic-containing solvent;
conducting the polymerization in a batch process; and
maintaining the polymerization at a temperature of 25° to less than 300° C. for a time effective to form a reaction product containing the polymer chains.

* * * * *